(12) United States Patent
Kim et al.

(10) Patent No.: US 9,609,572 B2
(45) Date of Patent: Mar. 28, 2017

(54) METHOD AND SYSTEM FOR SUPPORTING MOBILITY OF A MOBILE TERMINAL IN A SOFTWARE-DEFINED NETWORK

(71) Applicant: Foundation of Soongsil University-Industry Cooperation, Seoul (KR)

(72) Inventors: Young-Han Kim, Seoul (KR); Hyun-Sik Yang, Gyeonggi-Do (KR)

(73) Assignee: Foundation of Soongsil University Industry Cooperation, Seoul (KR)

( * ) Notice: Subject to any disclaimer, the term of this patent is extended or adjusted under 35 U.S.C. 154(b) by 191 days.

(21) Appl. No.: 14/309,154

(22) Filed: Jun. 19, 2014

(65) Prior Publication Data
US 2015/0288388 A1    Oct. 8, 2015

(30) Foreign Application Priority Data
Apr. 7, 2014    (KR) .................. 10-2014-0041250

(51) Int. Cl.
| | |
|---|---|
| *H04W 4/00* | (2009.01) |
| *H04W 40/02* | (2009.01) |
| *H04L 12/741* | (2013.01) |
| *H04L 29/12* | (2006.01) |
| *H04L 12/717* | (2013.01) |

(52) U.S. Cl.
CPC ............ *H04W 40/02* (2013.01); *H04L 45/42* (2013.01); *H04L 45/74* (2013.01); *H04L 61/103* (2013.01); *H04L 61/2007* (2013.01)

(58) Field of Classification Search
CPC ....... H04B 1/0003; H04L 45/74; H04L 61/20; H04W 40/02
See application file for complete search history.

(56) References Cited

U.S. PATENT DOCUMENTS

| | | | |
|---|---|---|---|
| 8,693,374 B1 * | 4/2014 | Murphy .................. | H04L 12/28 370/255 |
| 2014/0153572 A1 * | 6/2014 | Hampel .............. | H04L 12/6418 370/392 |

* cited by examiner

*Primary Examiner* — Derrick Ferris
*Assistant Examiner* — Farhad Ali
(74) *Attorney, Agent, or Firm* — Mintz Levin Cohn Ferris Glovsky and Popeo, P.C.; Kongsik Kim; Jonathon Western (57) ABSTRACT

A method and system for supporting the mobility of a mobile terminal in a software-defined network are disclosed. A method for supporting the mobility of a mobile terminal in a software-defined network according to an embodiment of the invention can include: routing a data packet of the mobile terminal to an authority switch serving as an anchor within a first partition, said routing performed by a switch by referencing a flow table; and setting a data path to an authority switch of a second partition, which is the partition containing the destination of the data packet, based on a rule provided by a controller and transmitting the data packet to a destination, said setting and transmitting performed by the authority switch of the first partition.

7 Claims, 5 Drawing Sheets

METHOD AND SYSTEM FOR SUPPORTING MOBILITY OF A MOBILE TERMINAL IN A SOFTWARE-DEFINED NETWORK

CROSS-REFERENCE TO RELATED APPLICATIONS

This application claims the benefit of Korean Patent Application No. 10-2014-0041250, filed with the Korean Intellectual Property Office on Apr. 7, 2014, the disclosure of which is incorporated herein by reference in its entirety.

BACKGROUND

1. Technical Field

The present invention relates to a software-defined network, more particularly to a method and system for supporting the mobility of a mobile terminal within a software-defined network.

2. Description of the Related Art

A software-defined network separates the control plane from the data plane and provides a protocol for communication between the two functions. Unlike the conventional method of IP-based routing, the paths of all packets may be determined by a controller, thereby enabling a more precise mode of traffic management compared to existing networks.

Also, since the routing paths can be easily altered by central control, the user can easily reflect the current network status or QoS policies, etc., in controlling the routing paths. However, the structure of a current software-defined network is centralized, so that there may be a high load burdened on the controller at the central location. To address this, DIFANE (distributed flow architecture for networked enterprises) was proposed to reduce the load on the controller and accommodate expansions. However, since DIFANE was proposed for enterprise networks, it is difficult to apply to mobile terminals, with which there are an extensive flow changes resulting from changes in position.

SUMMARY

An aspect of the invention is to provide a method and system for supporting the mobility of a mobile terminal in a software-defined network by defining a switch that serves as an anchor in each partition, defining a wild-card rule, and transmitting the wild-card rule to each of the switches.

Also, an aspect of the invention is to provide a method and system for supporting the mobility of a mobile terminal in a software-defined network by generating a data path between switches that serve as an anchor in each partition, based on the defined rules, in transmitting data packets between partitions.

Thus, a method and system for supporting the mobility of a mobile terminal in a software-defined network according to an aspect of the invention can minimize transmissions of cache rules as they are modified according to the movement of the mobile terminal.

One aspect of the invention provides a method for supporting the mobility of a mobile terminal in a software-defined network.

A method for supporting the mobility of a mobile terminal in a software-defined network according to an embodiment of the invention can include: routing a data packet of the mobile terminal to an authority switch serving as an anchor within a first partition, said routing performed by a switch by referencing a flow table; and setting a data path to an authority switch of a second partition, which is the partition containing the destination of the data packet, based on a rule provided by a controller and transmitting the data packet to a destination, said setting and transmitting performed by the authority switch of the first partition.

The method can further include, before said routing to the authority switch: allotting an address to the mobile terminal and storing an entry containing the allotted address and identification information of the mobile terminal, said allotting performed by the controller, wherein the switch references the flow table to route the data packet to the authority switch of the first partition if the mobile terminal is stored in the entry.

The method can further include, before said routing to the authority switch: transmitting the flow table to the switch, where the flow table includes a cache rule for a data path between switches included in a partition and a wild-card rule containing a definition of the authority switch for each partition, said transmitting performed by the authority switch of the first partition.

The method can further include: routing the data packet of the mobile terminal to an authority switch of a third partition if a partition containing the mobile terminal is changed due to a movement of the mobile terminal, said routing to the authority switch of the third partition performed by a switch included in the third partition by referencing the flow table; and generating a data path between the authority switch of the third partition and the authority switch of the second partition to transmit the data packet of the mobile terminal to the second partition.

Another aspect of the invention provides an apparatus and a system for supporting the mobility of a mobile terminal in a software-defined network.

A system for supporting a mobility of a mobile terminal in a software-defined network according to an embodiment of the invention can include: a switch configured to route a data packet of the mobile terminal by using a flow table; an authority switch configured as an anchor to a different partition for the switch included in a first partition; and a controller configured to define a rule for open flow between authority switches of different partitions, wherein the authority switch of the first partition generates a data path to an authority switch of a second partition, which is the partition containing the destination of the data packet, based on the rule and transmits the data packet through the data path.

The controller can allot an address to the mobile terminal and can store and manage an entry containing the allotted address and identification information of the mobile terminal.

If an entry for the mobile terminal is registered in the controller, the switch can route the data packet to the authority switch of the first partition by using the flow table.

Another embodiment of the invention can provide a controller in a software-defined network that includes: an IP allotment unit configured to allot an IP address for a mobile terminal; an entry management unit configured to register an entry after generating the entry by binding the IP address allotted to the mobile terminal with identification information of the mobile terminal; and a protocol management unit configured to distribute a rule for a flow path control of a data packet for the registered entry to each of the switches.

According to an embodiment of the invention, it is possible to support the mobility of a mobile terminal in a software-defined network by defining switches that serve as anchors for their respective partitions, defining wild-card rules, and transmitting the rules to the switches.

Furthermore, based on the defined rules, a data path can be generated between switches that serve as anchors for different partitions, and the transmission of data packets can be performed via the data path, to support the mobility of a mobile terminal according to an embodiment of the invention.

Thus, an embodiment of the invention can minimize transmissions of cache rules as they are modified according to the movement of the mobile terminal Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Certain embodiments of the invention will be described below in more detail with reference to the accompanying drawings.

Figure 1:
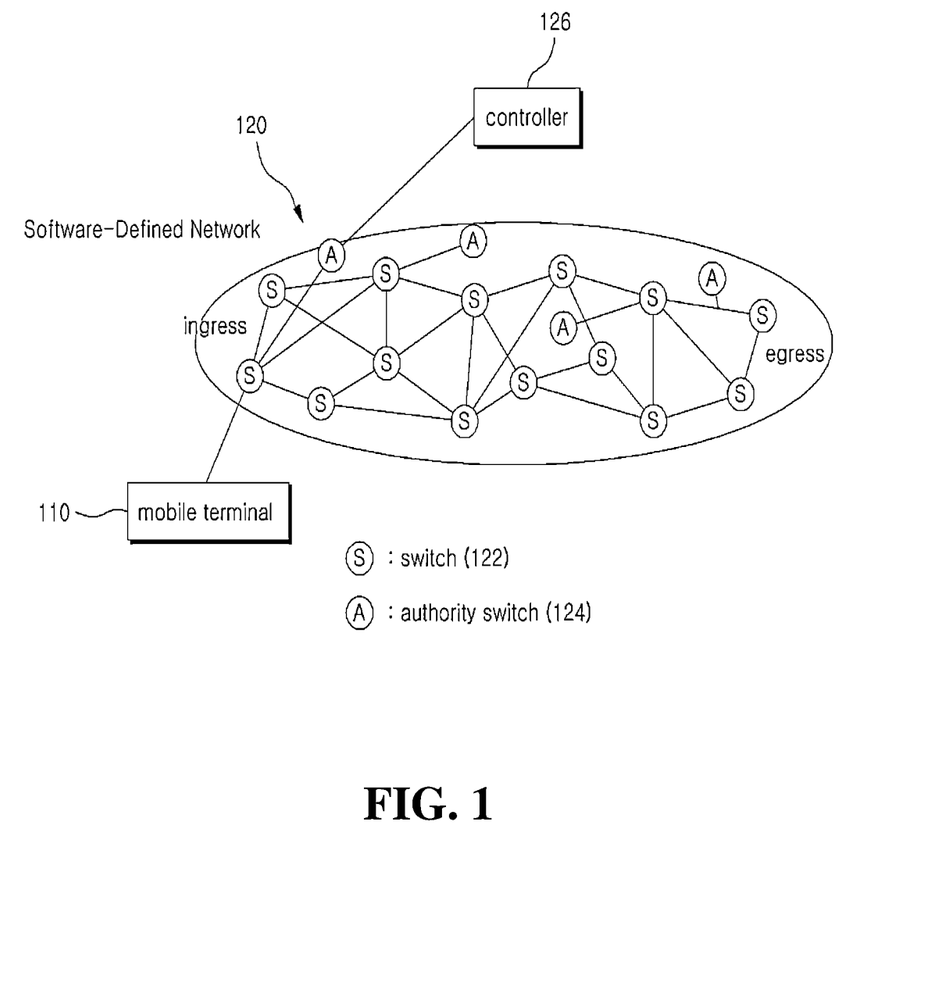
FIG. 1 schematically illustrates a software-defined network system capable of supporting the mobility of a mobile terminal according to an embodiment of the invention.
Figure 2:
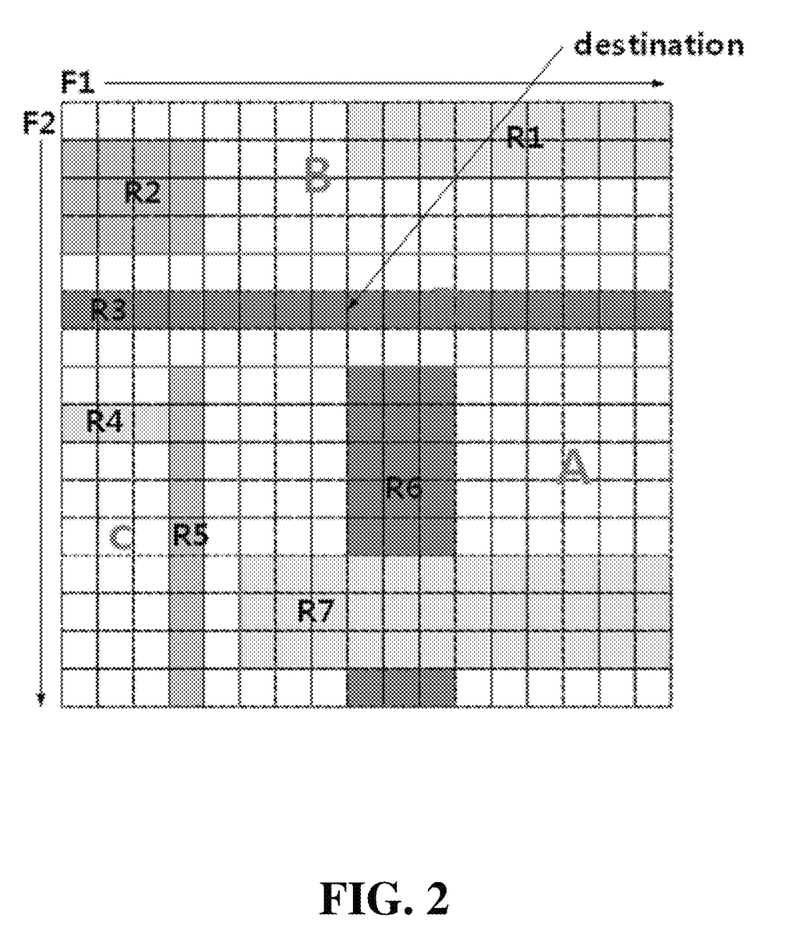
FIG. 2 illustrates an example of an authority rule according to an embodiment of the invention.

FIG. 1 schematically illustrates a software-defined network system capable of supporting the mobility of a mobile terminal according to an embodiment of the invention, and FIG. 2 illustrates an example of an authority rule according to an embodiment of the invention.

Referring to FIG. 1, a system according to an embodiment of the invention may include at least one mobile terminal 110 and a software-defined network 120.

The mobile terminal 110 may be a device for sending and receiving data packets over the software-defined network 120 to and from other devices (e.g. a server).

In order to exchange data packets over the software-defined network 120, the mobile terminal 110 may first be allotted an address (e.g. an IP address) through the software-defined network 120. The actual method by which a mobile terminal 110 may generally be allotted an IP address is well known to the skilled person, and thus will not be described here in further detail.

The software-defined network 120 may include switches 122, authority switches 124, and a controller 126, as illustrated in FIG. 1.

A switch 122 may be a device for routing the data packets of the mobile terminal 110 within a partition.

A switch 122 can route the data packets of the mobile terminal 110 to another switch or to an authority switch 124, which serves as an anchor, within the partition based on a flow table provided by the authority switch 124.

An authority switch 124 may serve as an anchor for the switches 122 included in the partition. The authority switch 124 can analyze the data packets provided by a switch 122 included in the partition, based on a set of authority rules distributed by the controller, to form a data path to another authority switch belonging to the destination partition. That is, the flow rules for respective sources and destinations may be defined in the authority rules.

Also, based on the authority rules distributed by the controller 126, the authority switch 124 can generate a flow table that includes cache rules, which may include data paths for the switches included in the partition, and wild-card rules, regarding the authority switch for each partition, and can transmit the flow table to the switches within the partition. As a result, the switches in the partition can reference the flow table to route the data packets of the mobile terminal 110 to another switch within the partition or to the authority switch.

The routing of data packets between different partitions can be performed through a data path between the authority switches that serve as anchors for the respective partitions. Thus, even when the partition is changed due to the movement of the mobile terminal 110, the mobile terminal 110 can transmit data packets through the data path between the authority switch serving as an anchor of the partition to which the location was changed and another authority switch belonging to the destination partition. Accordingly, even if the partition is changed due to the movement of the mobile terminal 110, time delays can be minimized without having to change the flow table, so as to support the mobility of the mobile terminal.

In an embodiment of the invention, a partition may be an imaginary area included in the coverage area of an authority switch, and can refer to a cell, a region, etc.

The controller 126 may be a device that assigns and manages rules for definitions (e.g. of paths) between the switches in a software-defined network, and transmits the rules to each of the authority switches 124.

Also, the controller 126 can identify a mobile terminal 110 through the switch port information and the ARP (address resolution protocol) packet received from the switch. The controller 126 storing the information of the mobile terminal can allot an address (e.g. IP) that the mobile terminal is to use, and can generate and store an entry that defines the allotted information and the identification information of the terminal Also, the controller 126 can use an open flow protocol to transfer a method of forwarding data packets, definitions of VLAN priority values, etc., to the switches 122 and authority switches 124.

Also, for a packet of which there is no flow entry registered beforehand, the controller 126 can receive information on the packet from the switch 122, determine the method of processing the packet, and transfer it to the switch.

In this way, the controller 126 can provide the various definitions, processing methods, etc., needed for controlling each data packet in the software-defined network.

According to an embodiment of the invention, the controller 126 may store rules regarding open flow with the authority switches functioning as anchors for their respective partitions and may distribute the rules to the authority switches.

For example, the controller 126 can store partition rules for each partition, and the partition rules can be defined in every switch by the controller. That is, the partition rules may include information on which authority switch has which rules.

An authority switch 124 may have the authority rules distributed by the controller 126, and the authority rules may include flow rules related to sources and destinations (i.e. data paths). Also, the authority rules may additionally include rules for supporting the mobility of a mobile terminal 110.

Thus, the authority switch 124 can reference the authority rules to transmit the cache rules for transmitting from every switch to the destination to each switch 122, and can define a flow table, by which to transmit a data packet to a destination regardless of its source, as a wild-card rule and transmit it to each switch 122. FIG. 2 shows an example of an authority rule.

Figure 3:
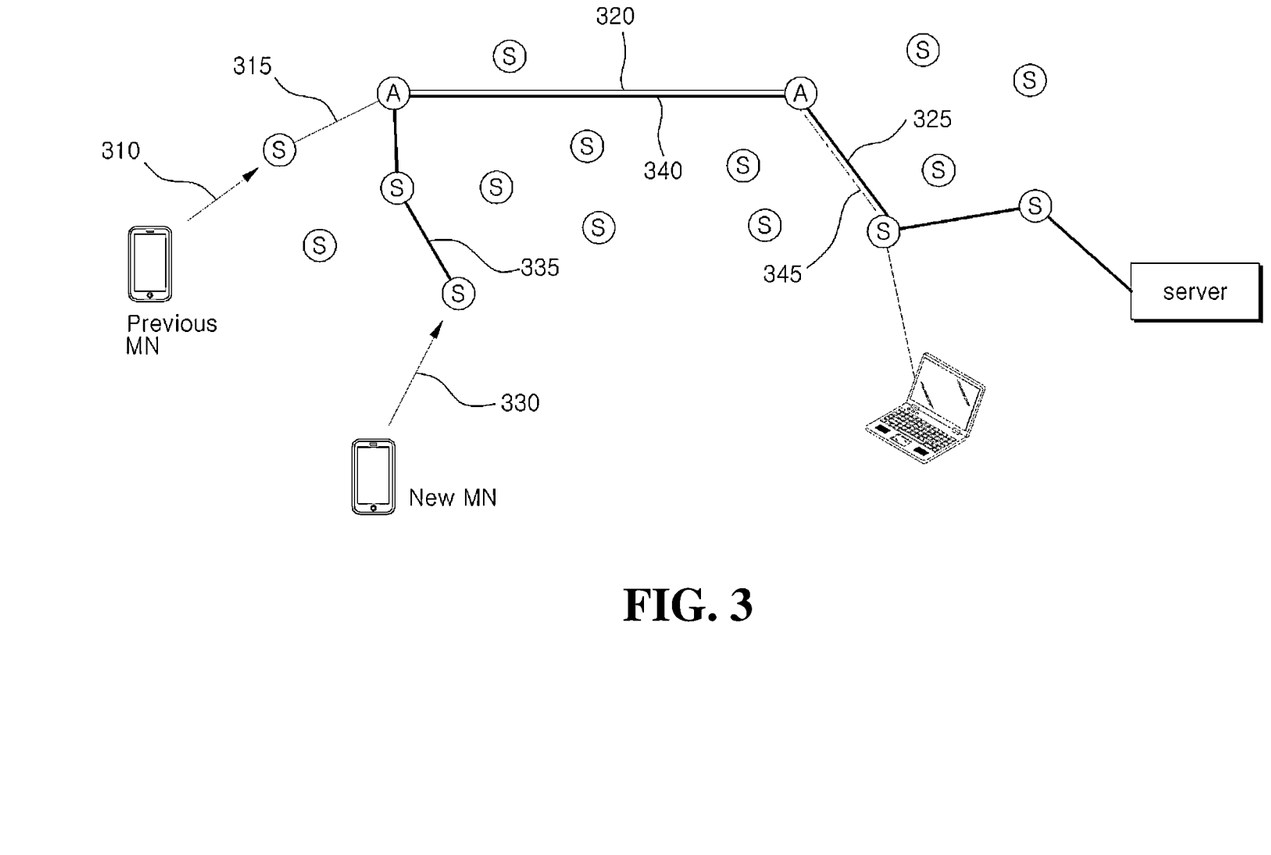
FIG. 3 is a flow diagram illustrating a method for supporting the mobility of a mobile terminal according to an embodiment of the invention.

FIG. 3 is a flow diagram illustrating a method for supporting the mobility of a mobile terminal according to an embodiment of the invention.

The descriptions below will assume that, prior to supporting the mobility of the mobile terminal in the software-defined network, the mobile terminal 110 was allotted an IP address by the controller 126, and that an entry was registered beforehand that includes the allotted IP address and the identification information of the mobile terminal 110.

In operation 310, the mobile terminal 110 may transmit a data packet through a switch included in the partition.

In operation 315, the switch may reference the flow table and route the data packet to the authority switch that serves as an anchor for the partition.

Then, in operation 320, the authority switch may analyze the data packet routed by the switch, and then, by referencing the authority rules distributed by the controller 126, may form a data path with the authority switch of the destination partition.

Then, the data packet routed by the switch may be transmitted by the authority switch through the data path thus formed to the destination partition.

In operation 325, the authority switch of the destination partition may reference the authority rules and transmit the data packet to a switch within the partition.

Thus, the data packet of a mobile terminal 110 may be routed to another partition through authority switches 124 that serve as anchors for the partitions, to enable a handover with minimal delays resulting from the movement of the mobile terminal 110.

While in the state described above, suppose that the position of the mobile terminal 110 is changed.

The mobile terminal 110 may transmit a data packet to a nearby switch (operation 330).

The new switch, on receiving the data packet according to the movement of the mobile terminal, may reference the flow table and route the data packet via another switch to the authority switch serving as an anchor for the partition (operation 335).

Then, in operation 340, the authority switch may transmit the data packet through the formed data path to the authority switch of the destination partition.

In operation 345, if the destination of the data packet is changed, the authority switch of the destination partition may transfer the data packet to the switch corresponding to the changed destination.

Figure 4:
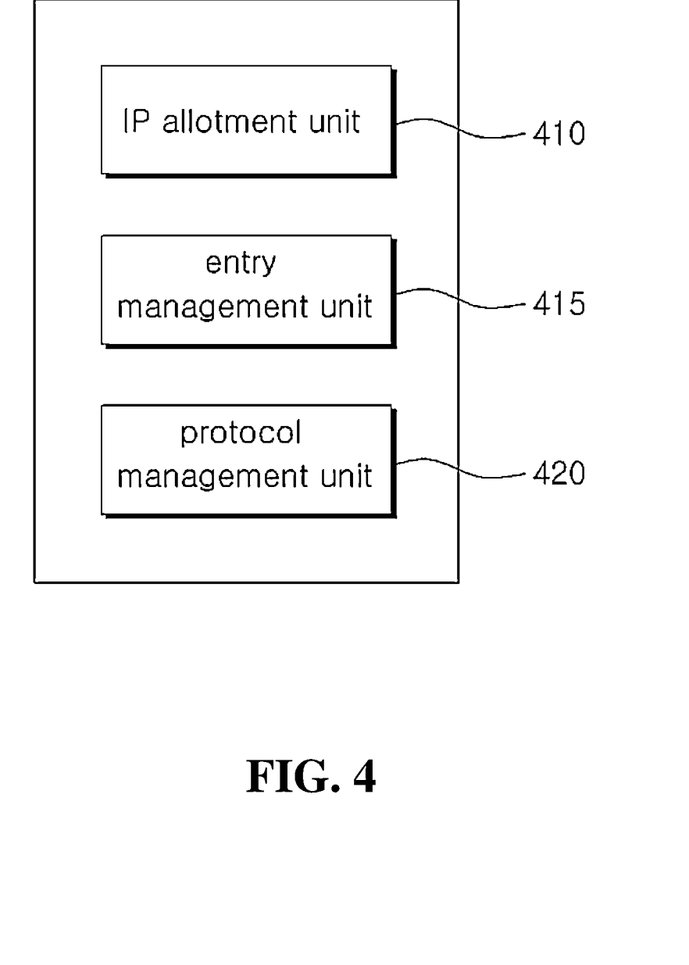
FIG. 4 is a block diagram schematically illustrating the internal composition of a controller according to an embodiment of the invention.

FIG. 4 is a block diagram schematically illustrating the internal composition of a controller according to an embodiment of the invention.

Referring to FIG. 4, a controller 126 according to an embodiment of the invention may include an IP allotment unit 410, an entry management unit 415, and a protocol management unit 420.

The IP allotment unit 410 may be a device for allotting an IP address for the mobile terminal 110. Such a device is well known to those skilled in the art, and therefore will not be described here in further detail.

The entry management unit 415 may be a device for generating an entry by binding the IP address allotted to the mobile terminal 110 with the mobile terminal, and may for registering and managing such entries.

The protocol management unit 420 may be a device for generating rules regarding the definitions between switches and authority switches, definitions between authority switches functioning as anchors for their respective partitions, and the like, based on an open flow protocol, and may mange the rules and distribute the rules to the authority switches 124.

Figure 5:
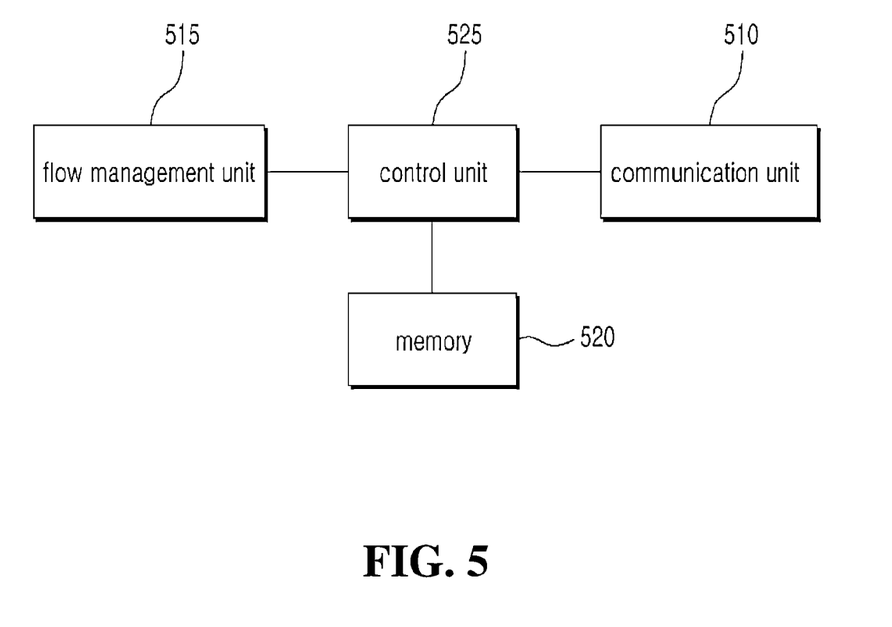
FIG. 5 is a block diagram schematically illustrating the internal composition of an authority switch according to an embodiment of the invention.

FIG. 5 is a block diagram schematically illustrating the internal composition of an authority switch according to an embodiment of the invention.

Referring to FIG. 5, an authority switch according to an embodiment of the invention may include a communication unit 510, a flow management unit 515, a memory 520, and a control unit 525.

The communication unit 510 may be a device for sending and receiving data packets over a communication network to and from other devices (e.g. switches 122, the controller 126, etc.).

The communication unit 510 can also form a data path with the authority switch of another partition according to the control provided by the control unit 525.

The flow management unit 515 may be a device for generating a flow table by using the authority rules provided by the controller 126, where the flow table may include cache rules that define data paths between switches included in the coverage area of the authority switch (i.e. in the partition) and wild-card rules that include definitions regarding the authority switch of each partition, and for providing the flow table to switches within the partition.

The memory 520 may store various data needed for operating an authority switch according to an embodiment of the invention.

The control unit 525 may be a device for controlling the internal components (e.g. the communication unit 510, flow management unit 515, memory 520, etc.) of the authority switch according to an embodiment of the invention.

Also, when a data packet is received from a switch through the communication unit 510, the control unit 525 can analyze the data packet and provide control such that a data path is formed to the authority switch of the destination partition of the data packet.

A method for propagating a message in a social network according to an embodiment of the present invention can be implemented in the form of program instructions that may be performed using various computer means and can be recorded in a computer-readable medium. Such a computer-readable medium can include program instructions, data files, data structures, etc., alone or in combination.

Examples of the program of instructions may include not only machine language codes produced by a compiler but also high-level language codes that can be executed by a device for electronically processing information, such as a computer, through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains.

What is claimed is:

1. A method for supporting a mobility of a mobile terminal in a software-defined network, the method comprising:
   generating a flow table using authority rules distributed by a controller, the flow table including a cache rule for a data path between switches included in a partition and a wild-card rule containing a definition of an authority switch serving as an anchor for each partition, said generating performed by an authority switch serving as the anchor of a first partition;
   transmitting the flow table to a switch, said transmitting performed by the authority switch of the first partition;
   routing a data packet of the mobile terminal to the authority switch of the first partition, said routing performed by the switch by referencing the flow table; and
   setting a data path to an authority switch serving as the anchor of a second partition based on a rule provided by the controller and transmitting the data packet to a destination, said second partition containing the destination of the data packet, said setting and transmitting performed by the authority switch of the first partition,
   wherein the authority switch is one of a plurality of switches included within each partition.

2. The method of claim 1, further comprising, before said routing to the authority switch:
   allotting an address to the mobile terminal and storing an entry containing the allotted address and identification information of the mobile terminal, said allotting performed by the controller,
   wherein the switch references the flow table to route the data packet to the authority switch of the first partition if the mobile terminal is stored in the entry.

3. The method of claim 1, further comprising:
   routing the data packet of the mobile terminal to an authority switch of a third partition if a partition containing the mobile terminal is changed due to a movement of the mobile terminal, said routing to the authority switch of the third partition performed by a switch included in the third partition by referencing the flow table; and
   generating a data path between the authority switch of the third partition and the authority switch of the second partition to transmit the data packet of the mobile terminal to the second partition.

4. A system for supporting a mobility of a mobile terminal in a software-defined network, the system comprising:
   a switch configured to route a data packet of the mobile terminal by using a flow table;
   an authority switch configured as an anchor to a different partition for the switch included in a first partition; and
   a controller configured to define a rule for open flow between authority switches of different partitions,
   wherein
   the authority switch of the first partition generates a data path to an authority switch serving as the anchor of a second partition based on the rule and transmits the data packet through the data path, said second partition containing the destination of the data packet, and, before the switch routes the data packet, generates the flow table using authority rules distributed by the controller, the flow table including a cache rule for a data path between switches included in a partition and a wild-card rule containing a definition of the authority switch serving as an anchor for each partition, and transmits the flow table to the switch, and
   the authority switch is one of a plurality of switches included within each partition.

5. The system of claim 4, wherein the controller allots an address to the mobile terminal and stores and manages an entry containing the allotted address and identification information of the mobile terminal.

6. The system of claim 5, wherein the switch routes the data packet to the authority switch of the first partition by using the flow table if an entry for the mobile terminal is registered in the controller.

7. A non-transitory recorded medium tangibly embodying a program of instructions for performing a method for supporting a mobility of a mobile terminal in a software-defined network, the method comprising:
   generating a flow table using authority rules distributed by a controller, the flow table including a cache rule for a data path between switches included in a partition and a wild-card rule containing a definition of an authority switch serving as an anchor for each partition, said generating performed by an authority switch serving as the anchor of a first partition;
   transmitting the flow table to a switch, said transmitting performed by the authority switch of the first partition;
   routing a data packet of the mobile terminal to the authority switch of the first partition, said routing performed by the switch by referencing the flow table; and
   setting a data path to an authority switch serving as the anchor of a second partition based on a rule provided by the controller and transmitting the data packet to a destination, said second partition containing the destination of the data packet, said setting and transmitting performed by the authority switch of the first partition, wherein the authority switch is one of a plurality of switches included within each partition.

\* \* \* \* \*